United States Patent [19]

McKnight

[11] 4,158,329
[45] Jun. 19, 1979

[54] DRIP COFFEE BREWER

[76] Inventor: Robert J. McKnight, Bldg. 10, Apt. 5, Jamestowne Village, Toms River, N.J. 08753

[21] Appl. No.: 899,320

[22] Filed: Apr. 24, 1978

[51] Int. Cl.² .................. A47J 31/02; A47J 31/06; A47J 31/32

[52] U.S. Cl. .......................... 99/295; 99/306; 99/302 FB; 426/80

[58] Field of Search ............ 99/306, 295, 302 R, 99/302 FB, 307; 426/77, 80

[56] References Cited

U.S. PATENT DOCUMENTS

| | | | |
|---|---|---|---|
| 3,120,170 | 2/1964 | Garte | 99/302 |
| 3,345,935 | 10/1967 | Waline | 99/295 |
| 3,374,897 | 3/1968 | Martin | 99/306 |
| 3,446,624 | 5/1969 | Luedtke | 99/295 |
| 3,800,690 | 4/1974 | Molenaar | 99/295 |
| 4,027,582 | 6/1977 | O'Connell | 99/306 |

*Primary Examiner*—Robert W. Jenkins

[57] ABSTRACT

A drip coffee brewer for the brewing of a single serving of coffee consisting of a standard hot beverage cup, made of self-insulating material such as expanded polystyrene, with a portion of the bottom omitted or removed and with a cup-shaped capsule containing, integral with the bottom thereof, a raised filter-supporting grid of circular ridges, the troughs between which are connected to radial ducts leading to a central spout. The capsule, which contains a measured quantity of ground roasted coffee beans, has a perforated cover onto which boiling water is poured. The brewer is held firmly in a cup holder resting on the lip of a container. A plastic bulb is placed on top of the brewer and, when compressed, expedites the flow of water through the ground coffee beans. The capsule can be vacuum-sealed to preserve the freshness of the ground coffee. The capsule and brewing cup are disposable, the cost being less than the cost of filters for comparable brewers.

44 Claims, 8 Drawing Figures

DRIP COFFEE BREWER

This invention was disclosed under the Document Disclosure Program under title of "Improved Drip Coffee Maker," filing date June 17, 1977, Disclosure Document No. 061,733.

BACKGROUND OF THE INVENTION

There are three basic methods utilized in brewing coffee: (1) the Immersion method in which ground coffee beans are immersed in hot or boiling water, allowing sufficient dwell time for the coffee to "steep"; (2) the Regenerative or recycling method in which already brewed coffee is recycled through the coffee grounds to extract more flavor; and (3) the "once-through" drip method in which the water passes through the coffee grounds only once. Two types exist which use method #3; (a) those depending only on gravity to produce the flow through the coffee grounds and (b) the vacuum brewer in which condensing steam creates a vacuum to suck the water speedily through the coffee grounds. This method also permits the user to control the dwell time to extract the flavor without extracting excessive bitterness.

It is generally accepted by coffee brewing experts that, to obtain the best brew, the following conditions must be adhered to:

A. Coffee beans must be of high quality, properly roasted, and freshly ground or vacuum packed.

B. Brewing surfaces or components which come into contact with the water or the brewed coffee must be thoroughly cleansed to remove all traces of stale coffee. Preferably, such components should not be re-used.

C. Coffee should never be re-heated.

D. Brewing water should be boiling hot and kept hot by the use of insulated containers; delays in the brewing process permit the beverage to cool and are undesirable.

E. So far as possible, coffee "fines" or pulverized particles should be removed from the brewed beverage.

It is conceded also by brewing experts that the best coffee is that brewed by the "once-through" drip process if the water passes relatively quickly through the ground coffee, but this method, unfortunately, does not produce as high a yield as some other methods.

The oldest method of brewing coffee utilizes a coffee pot which is familiar to everyone because it is still in use in churches and the like. This device brews by the immersion method whereby water is brought to a boil in a pot, the ground coffee is added, the coffee is allowed to "steep" until it is strong enough, sometimes being boiled to speed the process and obtain a greater yield, and the finished brew is poured into a drinking vessel using a wire-mesh strainer to screen out the coarse particles of coffee. Unfortunately, a substantial amount of "fines" or pulverized particles ends up in the drinking vessel. Of course, this process produces an inferior beverage, but it is simple and quick, and involves a minimum of utensils, with maximum yield.

The percolator is an improvement over the coffee pot, involving the spraying of boiling water over a basket of coarse ground coffee, then reheating the brewed coffee and repeating the process to get the maximum yield. The boiling, however, gives the finished beverage a burnt flavor. Also, there are many components required and it is also impossible to remove all remnants of stale coffee.

The "once-through" drip method as exemplified by the "Dripolator" involves a three-part vessel, hot water being poured into the top vessel from whence it drips through a limited number of small holes into the middle vessel containing a measured amount of finely ground coffee and sometimes a filter, thence flowing through a great many holes into the bottom vessel. The process is slow, the "dwell" time is unpredictable, the brewer components are usually uninsulated with large surfaces exposed to cooling air, and it is impossible to remove all remnants of stale coffee.

The principal disadvantage of this method is that, being a "once-through" process, the coffee beans must be very finely ground to produce a satisfactory yield. This produces a variable amount of "fines" often depending on the condition of the coffee grinder. These fines fill in the spaces between the coarse particles and retards the progress of the water through the brewer, sometimes stopping it altogether. Because long immersion of the coffee grounds in water imparts a bitterness to the beverage, any delay in the brewing process is objectionable. This process relies on the weight of the water only to produce the flow through the ground coffee.

Various means of providing additional pressure to speed the flow have been suggested: complicated and costly pumps as in U.S. Pat. Nos. 1,089,900 and 1,754,146; steam pressure as in U.S. Pat. No. 3,589,272; and vacuum as in the Silex brewer. All of these involve a multiplicity of components which are difficult to thoroughly cleanse to remove all remnants of stale coffee which impair the taste of the beverage. The Silex is the only brewer of this type in current use and it is not adapted to the brewing of single servings.

Other brewers in current use utilize the "once-through" gravity method to produce a single serving, the best known of these being the Melitta brewer which consists of a funnel-shaped vessel with an integral flange to support the brewer on the lip of a drinking cup. A costly funnel-shaped filter is placed inside the funnel, a measured quantity of ground coffee is placed in the cone formed by the filter and boiling water is poured into the brewer. No guide marks are provided to indicate the amount of water in the vessel; hence, unless the water is premeasured, the resultant brew is variable in strength. Also, it is impossible to obtain the maximum yield from this method. The brewer is cumbersome and it is space-consuming to store many of them since they do not nest, each brewer requiring 110 cubic inches of storage space. Also, it is impossible to remove all of the stale coffee from the brewer. With coffee selling at $3.00 per pound and this brewer yielding about 45 cups to the pound, the coffee costs almost 7¢ per cup which, added to the filter cost of 4.2¢ each, make the cost of a cup of coffee about 11¢.

There are other drip brewers in use, such as "Mr. Coffee", but these are costly and do not adapt to a single serving, although they are promoted for brewing 2 to 4 cups of coffee because of the recognition of the cost of brewing large portions of coffee when it is not all consumed. Restaurants and Diners use large drip brewers, but these use a cloth re-usable filter from which the stale coffee remnants cannot possibly be removed.

Because drip brewers in general rely on gravity flow of water through the brewer, they usually have a large diameter coffee compartment requiring a large diameter filter, and there is only a thin layer of ground coffee therein to reduce the resistance to the flow of the water. With this design, each drop of water passes through only a small thickness of grounds, resulting in a low yield from a given quantity of coffee beans. If the diameter were less, the stack would be higher and the yield would be greater.

OBJECTS OF THE INVENTION

The principal object of this invention is to provide a "once-through" drip coffee brewer adapted to produce a single serving of coffee which is not handicapped by any of the aforementioned drawbacks.

Another object is to provide a drip coffee brewer, all components of which are expendible and disposable, thus eliminating the clean-up required by all other coffee makers.

A still further object is to provide a drip coffee brewer which adapts to existing mass-production tooling, thus reducing the cost of components to the point where discard after a single use becomes feasible.

Still another object is to provide a drip coffee brewer wherein the user can control the rate of inflow of water, the dwell time, and the rate of outflow of beverage.

A further object is to provide a drip coffee brewer wherein compressed air is used to expedite the brewing process when desired.

It is yet another object to provide a cup-holder for use with a coffee brewer which nests compactly with identical cup holders, having contained therebetween a pierced diaphragm for use with the coffee brewer.

Another object is to provide an enclosed capsule provided with a filter and containing a measure of coffee, which is vacuum packed to preserve the freshness until opened or pierced, the enclosed capsule and contents being totally disposable.

A further object is to provide an enclosed coffee-containing capsule with means to control the number and size of openings to admit and discharge fluid to regulate the rate of inflow of water and the rate of outflow of beverage.

Another object of this invention is to provide a drip coffee brewer which yields more cups of beverage per pound of coffee beans.

A final object of this invention is to produce a drip coffee brewer which produces the quickest, best cup of coffee in the least time and with less mess to clean up.

BRIEF DESCRIPTION OF THE FIGURES

In FIG. 1, the diaphragm and cup-holder are omitted. FIG. 2 shows the cup of FIG. 1 along the line II—II.

SUMMARY OF THE INVENTION

Figure 1:
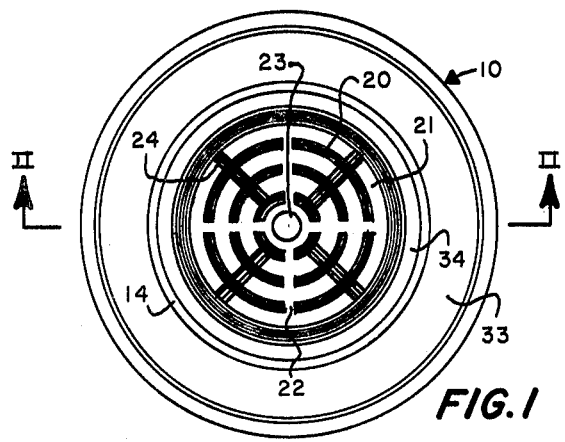
FIGS. 1 and 2 are plan view and cross-sectional view respectively of one embodiment of this invention showing a standard hot beverage cup with the interior modified to provide a shelf on the interior wall to support a multi-pierced diaphragm which separates the water compartment from the coffee compartment, and with the bottom modified to form a raised filter-supporting grid of circular ribs, the troughs between which serve as drainage channels leading to an open drain spout. The cup is supported by a cup-holder which rests on the lip of a drinking vessel.

Hot water, and the retention of the heat therein during the brewing process, is extremely important in brewing good coffee. Hence, the use of expanded polystyrene for brewing vessels is highly advisable, especially since such containers are in universal use for the dispensing of hot beverages.

The mass production of such cups requires multi-cavity molds which are very costly; and, if such molds can be adapted to produce a new product, it may be possible to realize important economies in manufacture. Most molds have two parts, and usually one part is a cavity to form the outside of a product and the other part a projecting part to form the inside of the product. Even if one part must be modified, it may be possible to use the other unchanged thus saving at least half of the mold cost. In some cases, only a small portion of one part needs changing, thereby saving even more than half of the mold cost. Consequently, using the shape and dimensions of existing mass-produced hot-beverage cups could result in substantial reduction in the cost.

The shape of conventional hot-beverage cups further adapts to the purposes of this invention because the bottom portion thereof wherein the ground coffee is placed is small in diameter, hence the height of the stack of ground coffee is greater than in existing drip brewers and each particle of water passes through more ground coffee on its path through the brewer increasing the yield in cups of beverage per pound of coffee beans; at the same time, the small diameter reduces the cost of the filter. The small diameter will tend to retard the rate of flow of water; however, by the use of supplementary air pressure the rate of flow is controllable.

Coffee brewers which use an inexpensive paper filter must provide a supporting grid or the like to support the filter, with troughs or holes beneath the filter to allow the brewed beverage to pass through the filter. Where a flat surface with multiple holes punched therein, the filter can perform its intended function only through the portion over the holes, which might represent only about a third of the area, thus requiring a large filter. If the grid is composed of ribs with flat top surfaces, the effective area of the filter is reduced though perhaps not to as great an extent as with holes. If the grid is made of comparatively narrow ribs, the effective surface is further increased so that as much as 90% of the area could be effective.

The design of the grid is important. If it consists of parallel straight ribs, the filter can sag into the troughs and become ineffective. This invention provides a grid made of narrow circular ribs formed in concentric circles with wider troughs between the ribs connected to radial ducts leading to a central drain spout.

This invention takes advantage of existing technology by using, in some cases, a standard hot beverage cup with a portion of the bottom removed, in another case a hot beverage cup, the outside of which conforms to the shape and dimensions of standard products on the market; and in another case, a hot beverage cup with the inside modified to provide a shoulder partway up the side wall to support a pierced diaphragm and a filter-supporting grid, as described heretofore, on the bottom. Instead of forming the grid integral with the bottom of the cup, a plastic disc, with a grid as described heretofore, may be inserted, the outer periphery of the disc being flanged in such a way that it is locked into position, the flange also preventing the passage of water therearound. For the cups with a portion of the bottom removed, a capsule is inserted in the bottom portion, the capsule having a lip to support the pierced diaphragm and a filter-supporting grid as described heretofore on the bottom.

If the capsule is made of thin plastic with a closed, tapered drain and a plastic cover sealed to the lip thereof, air can be exhausted after a filter and a measured quantity of ground coffee is inserted therein, thus preserving the freshness of the coffee until use. The cover can be punctured by means of a sharp prong or, preferably, a special multi-pronged tool, the prongs being of different lengths and the points being tapered so that the deeper they penetrate the larger will be the holes. By cutting off the tapered spout at a higher or lower elevation, the size of the drain opening can be controlled.

In brewing coffee by the drip method it is desirable to be able to control the dwell time by regulating the rate of water input and the rate of beverage output. The capsule as described herein gives the user complete control over these two factors and enables him to brew coffee to his individual taste. This capsule also contains means to lock the filter into a fixed position by providing a closed trough adjacent to the sidewall so that the outer periphery of the filter can be depressed therein and retained therein by means of a plastic wire retaining ring.

Because gravity flow of the water through a mass of finely ground coffee is unpredictable with respect to rate of flow, thus resulting in great variation in the strength and quality of the beverage, a simple bulb syringe which fits snugly into the top of the brewer, with a flange to limit its penetration and a thin inner projection to seal against the escape of air, is provided to expedite the flow. This bulb has a hole in its top with a plastic flap fastened to the inside of the bulb and covering the hole to serve as a one-way valve to prevent air from escaping when the bulb is compressed but admitting air when the applied pressure is released. It is necessary merely to place the heel of the hand on top of the bulb and press down, holding down for as long as necessary to complete the flow which can be determined by observing how full the cup is. The use of air pressure also produces a greater yield of beverage by forcing more of the fluid out of the grounds, much like squeezing a sponge.

The brewing vessel is provided with a slightly raised shoulder about ¼ inch from the top to serve as a gauge of the volume of water poured into the vessel.

A cup holder is provided to hold the vessel in position over a drinking cup, the holder being supported on the lip of the cup with projecting stepped ribs on the bottom thereof to center the brewer, approximately, on the cup. Holes are also provided in the cup-holder near the wall of the holder to serve two purposes: to permit the escape of entrapped air, and to enable the user to observe the level of the beverage in the drinking cup.

Holders are designed to nest compactly, and the pierced diaphragms, when used, nest in the opening provided to accept the brewer. Whereas the Melitta brewer occupies 110 cubic inches of storage space, and is not nestable, the holder described herein requires only 6 cubic inches including the diaphragm. A stack of 6 such as might be desirable is only 2¼" high. Melitta brewers would make a stack 24" high.

DESCRIPTION OF A PREFERRED EMBODIMENT

Figure 2:
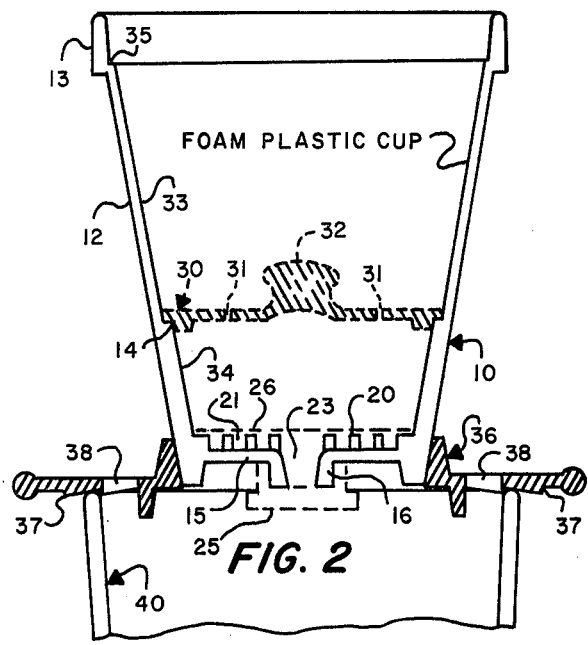

Referring now to the drawings, FIGS. 1 and 2, the reference numeral 10 denotes a drip brewer constructed in accordance with and embodying the invention. The brewer 10 includes a truncated-cone shaped body 12 having an exterior projecting shoulder 13 at the top, an interior annular shoulder 14 located at an intermediate elevation on the inside wall, and a bottom 15, in the center of which is a downwardly disposed drainspout 16. The bottom 15 also has a plurality of upwardly disposed circular concentric ribs 20 with circular troughs 21 between adjacent ribs, the troughs 21 being connected to radial ducts 22 leading to the opening 23 in drainspout 16. A plurality of radial ribs 24 connect the circular ribs 20, the tops of both being in a common plane. The drainspout 16 may be capped by means of a cap 25 which must be removed before using. A circular paper filter 26 is supported on ribs 20 and a circular diaphragm 30 containing pierced holes 31 and knob 32 rests on shoulder 14, the diameter of diaphragm 30 being slightly larger than the diameter of the upper portion of the inside wall 33 at the elevation of the shoulder 14, thereby being wedged securely in position when pressed into contact with shoulder 14. The side wall 34 in the lower portion is thicker than at the top. Near the top of the inside of the vessel there is a slight annular shoulder 35 constituting a visible ring by means of which the elevation of water poured into the brewer may be gaged. The brewer is held by a holder 36 which has a plurality of concentric circular stepped ribs 37 which serve to center the holder over a drinking cup 40 on which it is supported. Holder is also provided with a plurality of holes 38 to permit a view of the beverage level in the cup 40.

Figure 3:
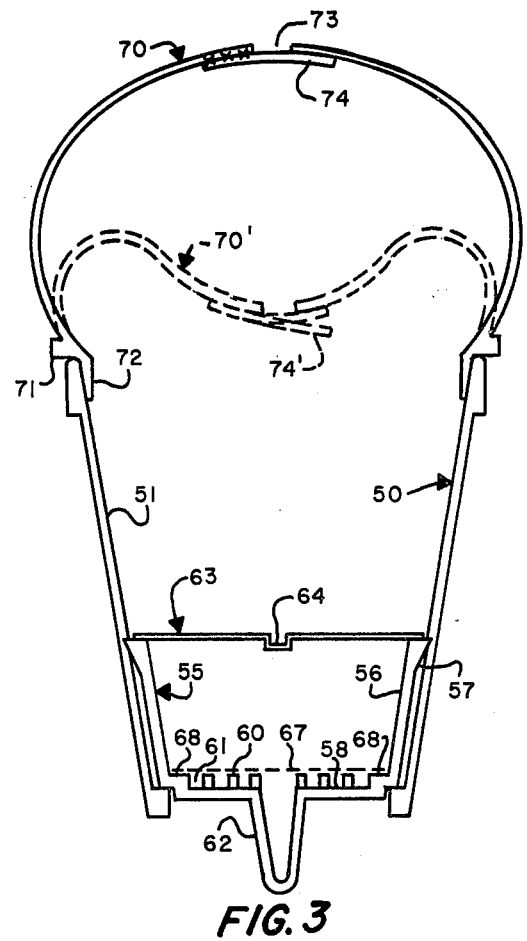
FIG. 3 is cross-sectional view of another embodiment of this invention showing a standard hot-beverage cup with the bottom removed and with a capsule of material similar to the cup inserted therein, the capsule including a raised filter-supporting grid and drain troughs leading to a closed central drain spout, the end of which must be cut off to make the brewer operational. The capsule is capped by a diaphragm which may be sealed thereto to make the capsule air tight. Diaphragm must be punctured to admit water at time of use. A syringe is fitted to the top of the brewer. Pressure on the syringe, as shown in phantom, generates pressure on fluid contained in the cup.
Figures 6, 7:
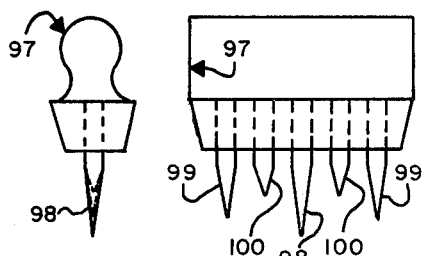
FIGS. 6 and 7 show front and side views respectively of a 5-prong tool for perforating the cover of a sealed capsule.

FIG. 3 shows a modification of the brewer of FIGS. 1 and 2, the brewer consisting of a standard hot beverage cup 50 with the bottom omitted. Pressed into the bottom of the cup 50 there is a capsule 55, made preferably of expanded polystyrene or the like, with sidewalls 56 parallel and spaced a slight distance from the inside of sidewall 51 of the cup 50, the top of the outside wall having a slight flare 57, the outside diameter of which is slightly greater than the diameter of the inside of the cup where the flared top engages the cup. The bottom of the capsule 55 is provided with a plurality of circular concentric ribs 60 between which there are circular concentric troughs 61 connecting to a plurality of radial ducts 61 leading to an enclosed cone shaped drain spout 62. A circular diaphragm 63, which may be made of thin plastic, is placed on the top of capsule 55. Diaphragm 63, which has a central dimple 64, may be sealed to the top of capsule 55 or may be wedged against the sidewall 51 of vessel 50. A special piercing tool as shown in FIGS. 6 and 7 may be used to pierce one or more holes, as may be desired, in diaphragm 63, the dimple 64 therein being used to center the piercing tool. A filter 67 is placed on top of the circular ribs 60 and may be sealed to shoulder 68, as with adhesive. A measured quantity of ground coffee is placed in capsule 55 before diaphragm 63 is sealed in place. The end of the tapered drain spout 62 must be cut off before the capsule is used, the elevation at which the cut is made determining the diameter of the drain opening which determines the rate at which fluid may be discharged from the capsule. The number and diameter of the holes pierced in the diaphragm 63 similarly determines the rate at which water flows into the capsule. If the air is exhausted from the capsule, the freshness of the coffee will be preserved as in vacuum-packed cans of coffee.

A pressure generating syringe 70 has an annular shoulder 71 which rests on the lip of the cup 50, and downwardly dependent flange 72 dimensionally designed to fit snugly inside the lip of cup 50. There is a small hole 73 in the top of syringe 70 with a flap 74 covering the hole on the inside of the syringe. One end of the flap 74 is attached to the inner wall of the syringe to retain it in position. When pressure is exerted on the syringe, the air therein is compressed thus exerting pressure on fluid placed in cup 50 to increase the rate of flow of fluid through the brewer. If desired, pressure on the syringe may be released permitting air to enter through hole 73, the flap valve 74 retracting sufficiently to permit such entry. Pressure on syringe may again be exerted and the process repeated. The compressed syringe is indicated by the phantom profile 70'.

Figure 4:
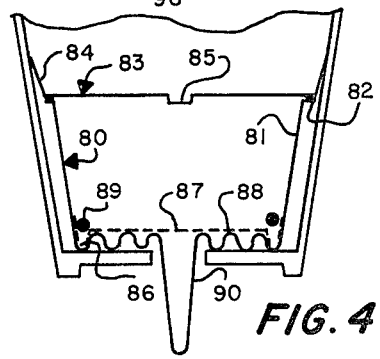
FIG. 4 shows a cross-sectional view of the bottom portion of a brewer similar to FIG. 3 except the capsule and its covering diaphragm are made of thin film plastic, and the filter is retained firmly in place by means of a plastic wire ring wedging the filter into the outermost drain trough. After the ground coffee is inserted, the air is exhausted and the diaphragm is sealed to the capsule.

FIG. 4 shows a capsule 80 similar to capsule 55 of FIG. 3 except that it is made entirely of thin plastic material. Capsule 80 has sidewall 81 and annular flanged top 82 to which is sealably attached circular lid 83 having a flared flange 84 and a centered dimple 85. The bottom of capsule 80 has a ribbed structure similar to capsule 55 of FIG. 3 except that there is an outer circular blind trough 86 which is not connected to the radial ducts leading to drainspout 90. A slightly oversize circular filter 87 is placed in the capsule resting on ribs 88, and the outer periphery of the filter is depressed into trough 86 where it is held in place by a plastic wire retainer 89. A measured quantity of ground coffee is placed in the capsule before it is sealed. The air is exhausted from the capsule to preserve the freshness of the coffee as in vacuum-packed cans of coffee. A portion of the spout 90 must be cut off and holes pierced in the lid 83 before capsule 90 is used. The capsule may be pressed into a standard hot-beverage cup, with bottom removed, as shown herein, or as shown in FIG. 3.

Figure 5:
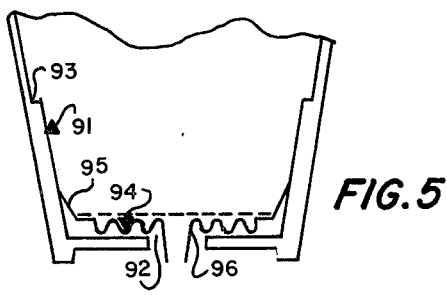
FIG. 5 is a cross-sectional view of the bottom portion of a brewer similar to FIGS. 1 and 2 wherein the filter-supporting grid and the drainage troughs are formed of thin film plastic.

FIG. 5 shows a means of providing a filter-supporting grid for insertion into a standard hot-beverage cup 91 with a portion of the bottom removed to provide circular opening 92 and with a shoulder 93 provided to support a pierced diaphragm as described in FIG. 2. The grid is contained in a thin circular disc 94 with a flared flange 95 dimensionally designed to fit snugly inside the bottom of the cup 91, a drain spout 96 projects through opening 92 in cup 91. The grid is identical to the grid described in FIG. 4 except the outer trough is replaced by a flat surface.

FIGS. 6 and 7 show a front view and a side view of a piercing tool in which the pointed prongs 98, 99 and 100, are each of a different length with tapered points such that any desired number of holes of controllable size may be pierced in the cover 83 of capsule 80 of FIG. 4, the piercing tool being centered by inserting prong 98 in the dimple 85 and pressing to pierce the hole. If more than one hole is desired, the tool is pressed down until prongs 99 pierce the cover. Tool may be rotated to cross-punch holes.

Figure 8:
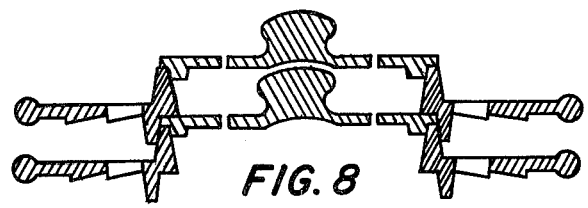
FIG. 8 shows a cross-section of a stack of nested cup-holders and diaphragms.

FIG. 8 shows how the pierced diaphragms and cup-holders of FIG. 2 may be nestably stacked compactly for storage.

While particular embodiments of this invention have been shown in the drawings and described herein, it will be apparent that many changes may be made in the form, arrangement and positioning of the various elements and it is not intended that embodiments disclosed herein shall limit the scope of the invention.

Having thus described and defined my improvement in drip coffee brewers, I now proceed to itemize the claims which I consider to be new, novel and worthy of a patent.

I claim:

1. A drip coffee brewer for the brewing of a single serving of coffee comprising a standard foam-plastic hot-beverage cup with a portion of the bottom omitted or removed, and with a cup-shaped capsule inserted in the bottom portion thereof, the capsule having a flared lip with an outside diameter slightly larger than the inside diameter of the beverage cup at the point of contact in the seated position, tending to wedge the capsule securely in position, the capsule having on the bottom thereof a raised filter-supporting grid consisting of approximately equally spaced concentric raised ridges with troughs therebetween, the troughs connecting to a plurality of radial ducts leading to a central closed drain spout, the end of which must be cut off to permit fluid to escape; and with a circular multi-pierced disc supported on the lip of the capsule.

2. A drip coffee brewer as described in claim 1 wherein the capsule and the covering disc are made of thin plastic, the disc being sealed to the top of the capsule after a filter and a measured quantity of ground roasted coffee are deposited therein, the air being exhausted from the capsule to make it vacuum-sealed.

3. A drip coffee brewer as described in claim 2 with means for exerting air pressure on water poured into the brewer, said means being a generally hemispherically shaped hollow plastic bulb, adapted to fit snugly on the lip of the brewer, with a one-way valve to prevent escape of air when the bulb is squeezed and to admit air when pressure thereon is released.

4. A drip coffee brewer as described in claim 3 wherein the brewer is held firmly in a holder, resting on the lip of a vessel, with holes therein to permit the escape of entrapped air from within the vessel, and to provide means to observe the level of the brewed beverage inside the vessel.

5. A drip coffee brewer as described in claim 1 wherein the drain spout is open.

6. A drip coffee brewer as described in claim 5 with means for exerting air pressure on water poured into the brewer, said means being a generally hemispherically shaped hollow plastic bulb, adapted to fit snugly on the lip of the brewer, with a one-way valve to prevent escape of air when the bulb is squeezed and to admit air when pressure thereon is released.

7. A drip coffee brewer as described in claim 6 wherein the brewer is held firmly in a holder, resting on the lip of a vessel, with holes therein to permit the escape of entrapped air from within the vessel, and to provide means to observe the level of the brewed beverage inside the vessel.

8. A drip coffee brewer as described in claim 7 wherein the disc is nestable in the holder, and the holders with the inserted discs are nestable one within another to provide compactness in storage.

9. A drip coffee brewer as described in claim 1 with means for exerting air pressure on water poured into the brewer, said means being a generally hemispherically shaped hollow plastic bulb, adapted to fit snugly on the lip of the brewer, with a one-way valve to prevent escape of air when the bulb is squeezed and to admit air when pressure thereon is released.

10. A drip coffee brewer as described in claim 9 wherein the brewer is held firmly in a holder, resting on the lip of a vessel, with holes therein to permit the escape of entrapped air from within the vessel, and to provide means to observe the level of the brewed beverage inside the vessel.

11. A drip coffee brewer as described in claim 10 wherein the disc is nestable in the holder, and the holders with the inserted discs are nestable one within another to provide compactness in storage.

12. A drip coffee brewer for the brewing of a single serving of coffee comprising a generally truncated cone-shaped foam-plastic cup, with a closed drain spout extending from the bottom thereof, and with an integral shoulder protruding from the inner wall of the cup at an intermediate elevation, the bottom of the cup having a raised filter-supporting grid consisting of approximately equally spaced raised ridges with troughs therebetween, the troughs connecting to a plurality of radial ducts leading to the drain spout, and with a multi-pierced disc resting on the shoulder.

13. A drip coffee brewer as described in claim 12 wherein the drain spout is open.

14. A drip coffee brewer as described in claim 13 with means for exerting air pressure on water poured into the brewer, said means being a generally hemispherically shaped hollow plastic bulb, adapted to fit snugly on the lip of the brewer, with a one-way valve to prevent escape of air when the bulb is squeezed and to admit air when pressure thereon is released.

15. A drip coffee brewer as described in claim 14 wherein the brewer is held firmly in a holder, resting on the lip of a vessel, with holes therein to permit the escape of entrapped air from within the vessel, and to provide means to observe the level of the brewed beverage inside the vessel.

16. A drip coffee brewer as described in claim 15 wherein the disc is nestable in the holder, and the holders with the inserted discs are nestable one within another to provide compactness in storage.

17. A drip coffee brewer as described in claim 12 with means for exerting air pressure on water poured into the brewer, said means being a generally hemispherically shaped hollow plastic bulb, adapted to fit snugly on the lip of the brewer, with a one-way valve to prevent escape of air when the bulb is squeezed and to admit air when pressure thereon is released.

18. A drip coffee brewer as described in claim 17 wherein the brewer is held firmly in a holder, resting on the lip of a vessel, with holes therein to permit the escape of entrapped air from within the vessel, and to provide means to observe the level of the brewed beverage inside the vessel.

19. A drip coffee brewer as described in claim 18 wherein the disc is nestable in the holder, and the holders with the inserted discs are nestable one within another to provide compactness in storage.

20. A drip coffee brewer for the brewing of a single serving of coffee comprising a standard foam-plastic hot-beverage cup with the interior modified to provide an annular integral shoulder located at an intermediate elevation on the inside wall of the cup, and with a portion of the bottom omitted or removed, being replaced by an inserted plastic bottom wedged therein and containing on the bottom thereof a raised filter-supporting grid consisting of approximately equally spaced raised ridges with troughs therebetween, the troughs connecting to a plurality of radial ducts leading to a central open drain spout, and with a multi-pierced disc resting on the shoulder.

21. A drip coffee brewer as described in claim 20 with means for exerting air pressure on water poured into the brewer, said means being a generally hemispherically shaped hollow plastic bulb, adapted to fit snugly on the lip of the brewer, with a one-way valve to prevent escape of air when the bulb is squeezed and to admit air when pressure thereon is released.

22. A drip coffee brewer as described in claim 21 wherein the brewer is held firmly in a holder, resting on the lip of a vessel, with holes therein to permit the escape of entrapped air from within the vessel, and to provide means to observe the level of the brewed beverage inside the vessel.

23. A drip coffee brewer as described in claim 22 wherein the disc is nestable in the holder, and the holders with the inserted discs are nestable one within another to provide compactness in storage.

24. A drip coffee brewer for the brewing of coffee comprising a generally truncated-cone shaped vessel having tapered side walls and a generally circular bottom with a central drain spout projecting downward therefrom, the bottom of the vessel having a raised filter-supporting grid consisting of approximately equally spaced concentric raised ridges, with troughs therebetween, the troughs connecting to a plurality of radially disposed ducts leading to the central drain spout, the vessel having also an integral inwardly disposed shoulder at an intermediate elevation, and with a multi-pierced disc resting on and supported by said shoulder.

25. A drip coffee brewer as described in claim 24 with means for exerting air pressure on water poured into the vessel.

26. A drip coffee brewer as described in claim 25 wherein the means for exerting air pressure on water poured into the vessel is a generally hemispherically-shaped hollow plastic bulb, adapted to fit snugly on the lip of the vessel, with a one-way valve to prevent escape of air when the bulb is squeezed and to admit air when pressure thereon is relaxed.

27. A drip coffee brewer for the brewing of coffee comprising a generally truncated-cone shaped container with a portion of the bottom omitted or removed, and with a truncated-cone shaped tight-fitting capsule inserted in the bottom portion of said container, the capsule having integral with the bottom thereof a raised filter-supporting grid consisting of raised ridges with troughs therebetween, the troughs connecting to a plurality of ducts leading to a central drain spout.

28. A drip coffee brewer as described in claim 27 wherein the capsule has a closed central drain spout and is provided with a generally flat top cover sealed to the capsule; and wherein a filter and a measured quantity of ground roasted coffee beans is placed therein and air is exhausted therefrom before cover is sealed thereto.

29. A drip coffee brewer as described in claim 28 with means for exerting air pressure on water poured into the vessel, said means being a generally hemispherically-shaped hollow plastic bulb, adapted to fit snugly on the lip of the vessel, with a one-way valve to prevent escape of air when the bulb is squeezed and to admit air when pressure thereon is relaxed.

30. A drip coffee brewer as described in claim 29 wherein the brewer is held firmly in a holder, resting on the lip of a container, with holes therein to permit the escape of entrapped air from within the container and to provide means of observing the level of fluid within the container.

31. A drip coffee brewer as described in claim 28 with means for exerting air pressure on fluid poured into the container.

32. A drip coffee brewer as described in claim 31 wherein the means for exerting air pressure on water poured into the vessel is a generally hemispherically-shaped hollow plastic bulb, adapted to fit snugly on the lip of the vessel, with a one-way valve to prevent escape of air when the bulb is squeezed and to admit air when pressure thereon is relaxed.

33. A drip coffee brewer as described in claim 27 wherein a multi-pierced disc rests on and is supported by the top of the capsule.

34. A drip coffee brewer as described in claim 33 with means for exerting air pressure on water poured into the vessel, said means being a generally hemispherically-shaped hollow plastic bulb, adapted to fit snugly on the lip of the vessel, with a one-way valve to prevent escape of air when the bulb is squeezed and to admit air when pressure thereon is relaxed.

35. A drip coffee brewer as described in claim 34 wherein the brewer is held firmly in a holder, resting on the lip of a container, with holes therein to permit the escape of entrapped air from within the container and to provide means of observing the level of fluid within the container.

36. A drip coffee brewer as described in claim 34 wherein the disc is nestable in the holder and the holders with the inserted discs are nestable one within another to provide compactness in storage.

37. A drip coffee brewer as described in claim 33 with means for exerting air pressure on fluid poured into the container.

38. A drip coffee brewer as described in claim 37 wherein the means for exerting air pressure on water poured into the vessel is a generally hemispherically-shaped hollow plastic bulb, adapted to fit snugly on the lip of the vessel, with a one-way valve to prevent escape of air when the bulb is squeezed and to admit air when pressure thereon is relaxed.

39. A drip coffee brewer as described in claim 37 wherein the disc is nestable in the holder and the holders with the inserted discs are nestable one within another to provide compactness in storage.

40. A drip coffee brewer as described in claim 27 with means for exerting air pressure on water poured into the vessel, said means being a generally hemispherically-shaped hollow plastic bulb, adapted to fit snugly on the lip of the vessel, with a one-way valve to prevent escape of air when the bulb is squeezed and to admit air when pressure thereon is relaxed.

41. A drip coffee brewer as described in claim 40 wherein the brewer is held firmly in a holder, resting on the lip of a container, with holes therein to permit the escape of entrapped air from within the container and to provide means of observing the level of fluid within the container.

42. A drip coffee brewer as described in claim 27 with means for exerting air pressure on fluid poured into the container.

43. A drip coffee brewer as described in claim 42, wherein the means for exerting air pressure on water poured into the vessel is a generally hemispherically-shaped hollow plastic bulb, adapted to fit snugly on the lip of the vessel, with a one-way valve to prevent escape of air when the bulb is squeezed and to admit air when pressure thereon is relaxed.

44. A drip coffee brewer as described in claim 42 wherein the brewer is held firmly in a holder, resting on the lip of a container, with holes therein to permit the escape of entrapped air from within the container and to provide means of observing the level of fluid within the container.

* * * * *